(No Model.)
E. MINOR.
SAP FEEDER AND REGULATOR.
No. 430,968. Patented June 24, 1890.
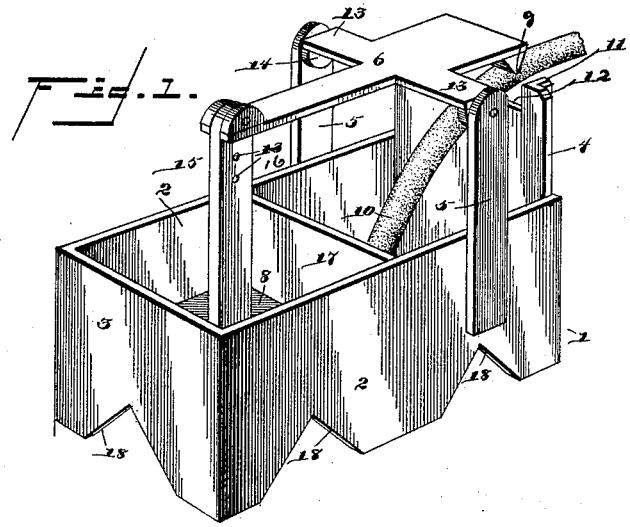
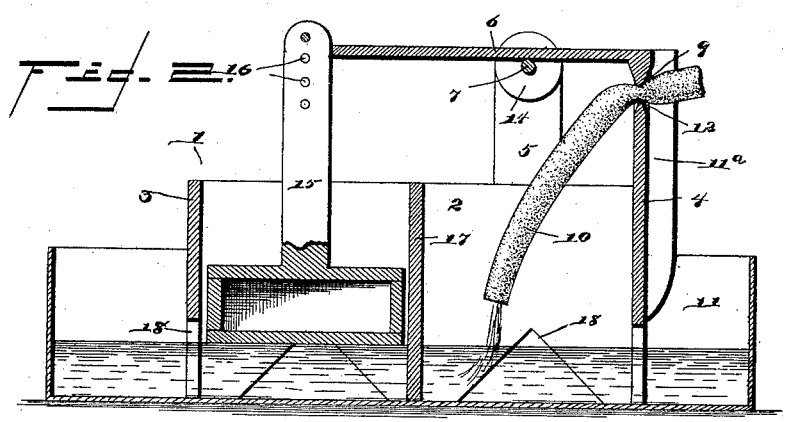
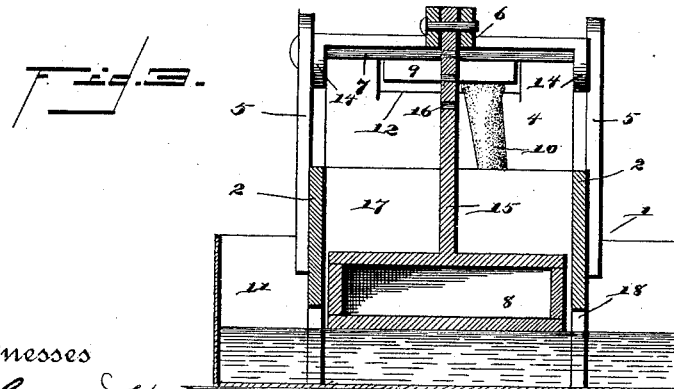
Witnesses
Inventor
Enos Minor.
By his Attorneys
C. A. Snow & Co.

UNITED STATES PATENT OFFICE.

ENOS MINOR, OF JEFFERSON, NEW YORK.

SAP FEEDER AND REGULATOR.

SPECIFICATION forming part of Letters Patent No. 430,968, dated June 24, 1890.

Application filed March 19, 1890. Serial No. 344,562. (No model.)

*To all whom it may concern:*

Be it known that I, ENOS MINOR, a citizen of the United States, residing at Jefferson, in the county of Schoharie and State of New York, have invented new and useful Sap Feeders and Regulators, of which the following is a specification.

The invention relates to improvements in sap feeders and regulators.

The object of the present invention is to provide a device adapted to regulate the flow of sap and to be controlled by the sap in the pan and capable of maintaining the liquid at any desired height in the pan and cutting off the flow of sap when the latter exceeds the given height and permitting the flow when the sap falls below that point, and thereby preventing the overflow of the pan by a too great amount of sap and the burning of the pan by an insufficient amount.

The invention consists in the construction and novel combination and arrangement of parts hereinafter fully described, illustrated in the accompanying drawings, and pointed out in the claim.

In the drawings, Figure 1 is a perspective view of a sap feeder and regulator constructed in accordance with this invention. Fig. 2 is a vertical longitudinal sectional view. Fig. 3 is a transverse sectional view.

Referring to the accompanying drawings, 1 designates the frame, which is constructed of suitable material and is preferably rectangular in section, and consists of the sides 2, the back 3, and the front 4, and is provided with a pair of vertical standards 5, that are secured to the sides 2 and are arranged opposite each other and near the front of the frame, and have pivoted between them a lever 6, that is mounted upon a transverse rod or shaft 7, and has connected with its rear end a float 8, and has its front end provided with a jaw 9, that is adapted to clamp and constrict a flexible rubber tube 10, leading from the supply of sap, and to release the said tube 10 and permit the flow of the sap accordingly as the float 8 is raised and lowered by the liquid or sap in a pan 11, whereby the quantity of sap remains constant at a given amount and is replenished to compensate for evaporation, and the supply is shut off when the quantity in the pan increases beyond the given amount. By this construction a positive, complete, and automatic control of the flow of sap is obtained which enables the operator after adjusting the device to attend to other duties.

The front 4 of the frame extends above the sides, and has secured to its outer face a pair of cleats 11$^a$, and has its upper edge between the cleats cut away, oppositely beveled, and formed into a jaw 12, that acts in conjunction with the jaw 10, which is formed by an oppositely-beveled transverse strip. The flexible rubber tube 10 rests upon the lower jaw 12, and when the float rises by the increase of sap in the pan the upper jaw is lowered and engages the tube and constricts the same and shuts off the flow of sap, and as soon as the sap in the pan falls the float descends and the rubber tube is released, and a flow of sap is permitted.

The lever 6 is provided with oppositely-arranged arms 13, that have ears 14 depending from them and provided with bearings or openings to receive the transverse rod 7, and the rear end of the lever is bifurcated and provided with a pair of vertical ears, between which is pivoted the upper end of a bar 15, which is provided with a vertical series of perforations 16, which permit the float and the amount of sap of the pan to be regulated. The float 8 is secured to the lower end of the bar, and is arranged in a chamber conforming to it and formed by a transverse partition 17. The lower edge of the frame is provided with a series of recesses 18, to permit the passage of the sap from one part of the pan to another without interference on the part of the device.

It will readily be seen that the float will rise and fall as the sap increases and diminishes in the pan, and the flow of sap will be cut off or be permitted, according to the amount in the pan, and that a thorough, complete, automatic, positive, and reliable control of the flow is obtained.

What I claim is—

The combination of the rectangular frame, provided with the triangular passages 18 and having its front 4 extended above the sides and provided with the jaw 12, having oppositely-beveled edges, the transverse partition, the vertical standards secured to the sides and provided with perforations 19, the transverse rod arranged in the perforations, the lever having oppositely-disposed arms extending laterally from it and provided with depending ears mounted upon the transverse rod and having its front end provided with the oppositely-beveled strips forming the jaw 9, and its rear end bifurcated and provided with the vertical ears, and the float having the bar 15, provided with a series of perforations and secured in the bifurcated end of the lever, substantially as described.

In testimony that I claim the foregoing as my own I have hereto affixed my signature in presence of two witnesses.

ENOS MINOR.

Witnesses:
 F. F. CRAFT,
 RUBEN CRAFT.